April 7, 1925.  
J. DEAN  
POLE AND POST PROTECTOR  
Filed Oct. 22, 1923    2 Sheets-Sheet 1
1,532,734
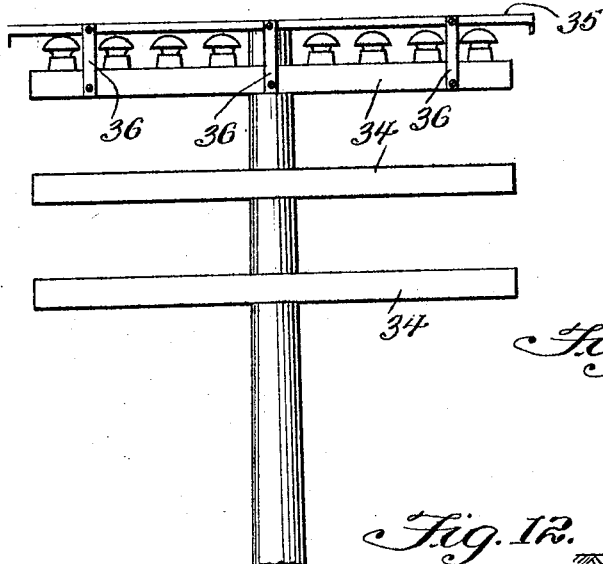
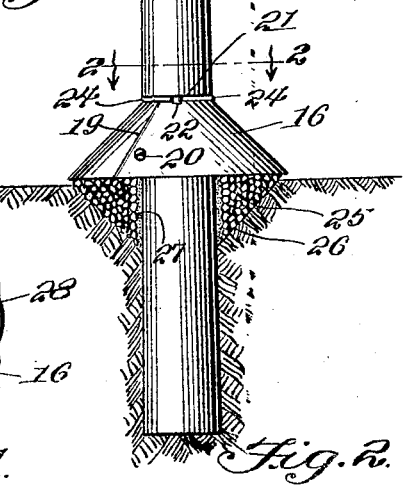
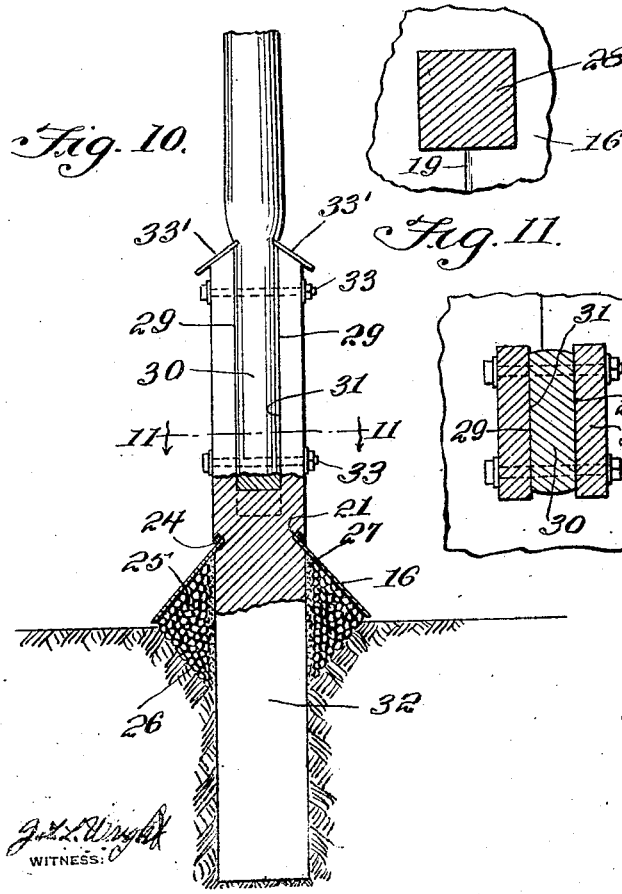
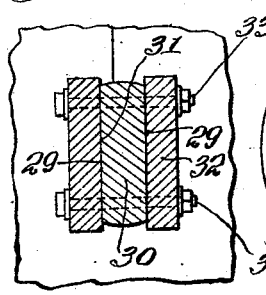
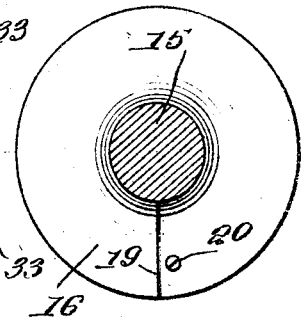
John Dean  
INVENTOR  
BY Victor J. Evans  
ATTORNEY April 7, 1925.                                              1,532,734
J. DEAN
POLE AND POST PROTECTOR
Filed Oct. 22, 1923                    2 Sheets-Sheet 2
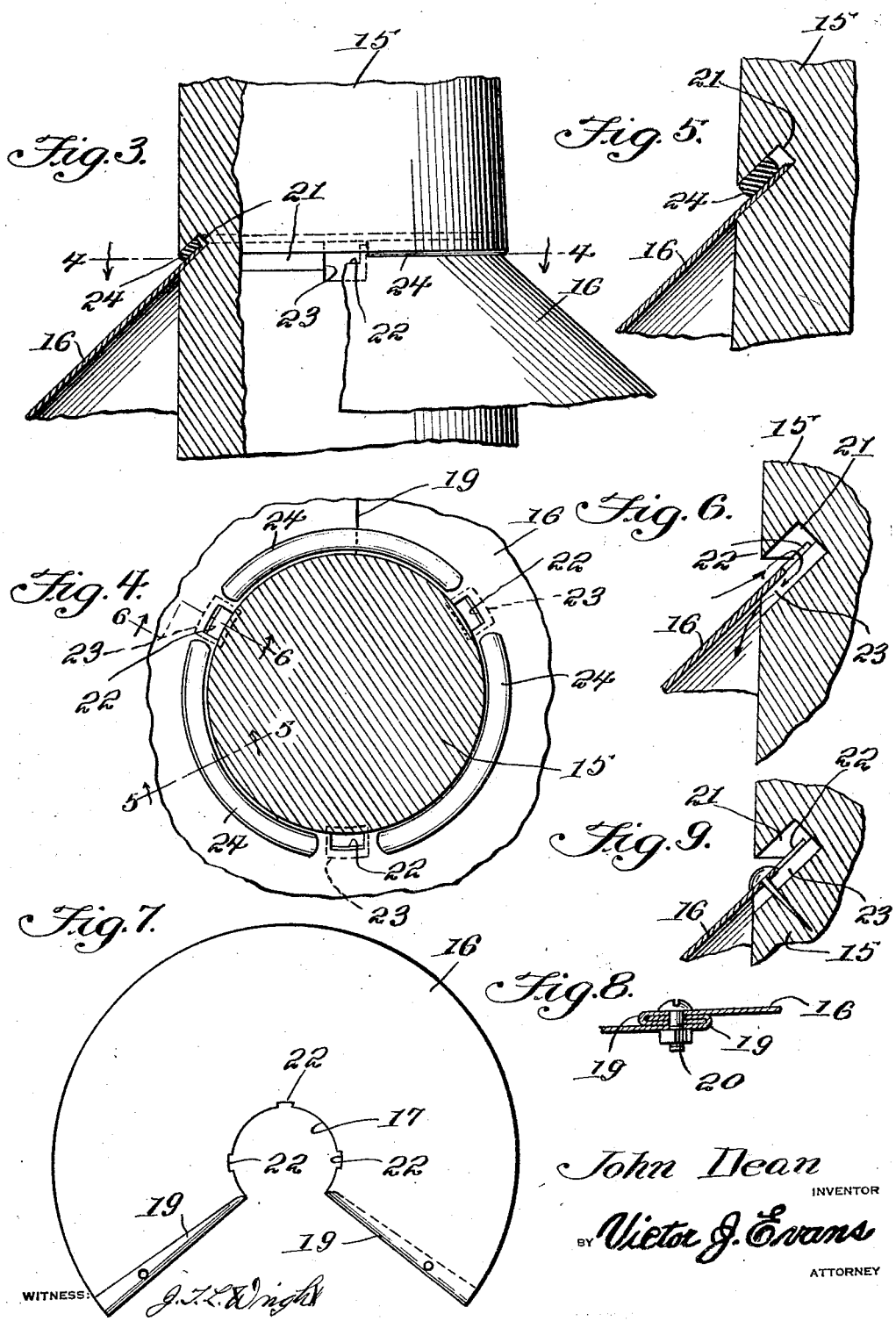

Patented Apr. 7, 1925.

1,532,734

UNITED STATES PATENT OFFICE.

JOHN DEAN, OF VICTORIA, BRITISH COLUMBIA, CANADA.

POLE AND POST PROTECTOR.

Application filed October 22, 1923. Serial No. 670,192.

*To all whom it may concern:*

Be it known that I, JOHN DEAN, a subject of the King of Great Britain, residing at Victoria, in the Province of British Columbia and Dominion of Canada, have invented new and useful Improvements in Pole and Post Protectors, of which the following is a specification.

This invention relates to means for protecting poles, posts, piles and the like.

An object of the present invention is the provision of means which may be applied to a pole near the bottom thereof to direct water and moisture away from the pole and to permit of a circulation of air around said pole at and adjacent the ground line for the purpose of preventing decay.

Another object of the invention is the provision of means of this character which in addition to shedding water and providing ventilation, will aid in supporting the pole in upright position.

With the above and other objects in view, the invention further includes the following novel features and details of construction, to be hereinafter more fully described, illustrated in the accompanying drawings and pointed out in the appended claims.

In the drawings:—

Figure 1 is an elevation showing a fragmentary part of a pole or post with the invention applied.

Figure 2 is a section on the line 2—2 of Figure 1.

Figure 3 is a fragmentary view partly in section and partly in elevation.

Figure 4 is a section on the line 4—4 of Figure 3.

Figures 5 and 6 are sections taken respectively on the lines 5—5 and 6—6 of Figure 4.

Figure 7 is a plan view of the blank from which the protector is formed.

Figure 8 is an enlarged section taken transversely through the meeting edges of the protector.

Figure 9 is a fragmentary section similar to Figure 6 but illustrating the protector fastened to the pole.

Figure 10 is an elevation showing a telegraph pole having a spliced lower end and the invention applied.

Figure 11 is a section on the line 11—11 of Figure 10.

Figure 12 is a transverse sectional view showing a fragmentary portion of the protector applied to a square pole.

Referring to the drawings in detail wherein like characters of reference denote corresponding parts, the reference character 15 indicates a pole or post of any desired character, for example, a telegraph pole. As is well known, poles, and posts decay rapidly adjacent the surface of the ground and in order to resist this decay by directing water and moisture away from the pole at this point, the present invention provides a shield or deflector 16 which is preferably formed of sheet metal. This shield is of hollow frustro-conical formation and comprises a blank shaped as shown in Figure 7 so as to provide an opening 17 which surrounds the pole and oppositely turned flanges 19 which interlock and which have extending therethrough fastening devices 20. Thus when these flanges are interlocked and secured together there is provided a hollow frustro-conical member open at the top and bottom. The opening at the top may be cut to the proper diameter for each individual pole.

The edges of the opening 17 are designed to extend within an annular groove 21 which surrounds the pole 15, the said groove extending inwardly and upwardly so as to incline in the same general direction as the inclination of the protector 16. Spaced notches 22 are preferably provided around the edge of the opening 17 and are adapted to register with grooves or notches 23 spaced around the groove 21. Thus, an air inlet is provided, by means of which air is admitted to the space between the protector and pole, as shown in Figure 6 of the drawings. Arcuate filler strips 24 are positioned within the groove 21 between the upper wall of the groove and the adjacent face of the protector 16, so that water will be prevented from entering the groove and at the same time the strips 24 will provide wedges for holding the protector or shield in place. The strips 24 are of segmental form and are positioned within the spaces between the notches 22.

The space between the pole and the shield 16 is filled with suitable ballast 25 and the ground around the pole is preferably hollowed out as at 26 to receive the ballast. This ballast aids in holding the pole in place and is of a character to permit of a circulation of air which enters through the passages provided by the notches 22 and 23, so that this portion of the pole usually subject to decay may be kept in a dry condition.

A lining or layer 27 of lime or other suitable material is placed between the pole and ballast.

The device may be attached to a pole of any cross sectional shape such as a round pole, illustrated in Figure 4 of the drawings, or a square pole indicated at 28 in Figure 12.

The invention may be applied to new poles, or to poles which have already begun to decay. In the latter case, the poles are cut off short of the ground and are cross sectionally reduced so as to provide oppositely flattened faces 29, illustrated in Figures 10 and 11 of the drawings. The extremity 30 thus provided upon the pole is received within the slotted end 31 of an extension 32 and is secured in position by bolts 33. This extension is placed within the ground and the protector applied after the manner previously described. The splice thus provided between the pole and the extension may be protected by means of a water shed 33'.

The pole shown in Figure 10 may have the joints between the cross arms 34 and the adjacent face of the pole protected by means of a protector cap or plate 35 which is supported from the topmost cross arm by arms 36.

It will be apparent from the foregoing description and accompanying drawings that the invention provides an exceedingly simple and efficient means for protecting poles, posts and the like and one which may be applied to new poles as the latter are being set, or may be applied to old poles which have begun to decay. In the latter case, the splice may be applied and the protector attached without taking down the pole or disconnecting the supported wires.

The invention is susceptible of various changes in its form, proportions and minor details of construction and the right is herein reserved to make such changes as properly fall within the scope of the appended claims.

Having described the invention what is claimed is:—

1. The combination with a pole or the like provided with an annular groove, of a hollow frusto-conical member open at the top and bottom and adapted to surround the pole with the edges of the top extending within the annular groove and said pole being provided with spaced vertically disposed notches communicating with the groove and said conical member having spaced notches around its upper edge which register with the notches in the pole to provide ventilating passages.

2. The combination with a pole or the like, of a hollow frusto-conical member open at the top and bottom and adapted to surround the pole near the lower end thereof, said member having notches around its upper edge and air circulating ballast located within the space between the pole and said member.

3. The combination with a pole or the like provided with an annular groove, of a hollow frusto-conical member open at the top and bottom and adapted to surround the pole with the edges of the top extending within the annular groove and said pole being provided with spaced vertically disposed notches communicating with the groove and said conical member having spaced notches around its upper edge which register with the notches in the pole to provide ventilating passages and spaced arcuate strips located between the ventilating passages and engaging the upper face of the frusto-conical member and the opposed wall of the annular groove and defining combined filler and retaining strips.

In testimony whereof I affix my signature.

JOHN DEAN.